(12) United States Patent
Lee

(10) Patent No.: US 12,166,243 B2
(45) Date of Patent: Dec. 10, 2024

(54) SECONDARY BATTERY

(71) Applicant: Samsung SDI Co., Ltd., Yongin-si (KR)

(72) Inventor: Sang Hyo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 746 days.

(21) Appl. No.: 17/278,992

(22) PCT Filed: Sep. 23, 2019

(86) PCT No.: PCT/KR2019/012341
§ 371 (c)(1),
(2) Date: Mar. 23, 2021

(87) PCT Pub. No.: WO2020/067688
PCT Pub. Date: Apr. 2, 2020

(65) Prior Publication Data
US 2022/0037747 A1 Feb. 3, 2022

(30) Foreign Application Priority Data

Sep. 27, 2018 (KR) .................. 10-2018-0115239

(51) Int. Cl.
*H01M 50/538* (2021.01)
*H01M 10/0525* (2010.01)
(Continued)

(52) U.S. Cl.
CPC ..... *H01M 50/538* (2021.01); *H01M 10/0525* (2013.01); *H01M 10/0587* (2013.01); *H01M 50/536* (2021.01)

(58) Field of Classification Search
CPC ............. H01M 50/538; H01M 50/536; H01M 10/0525; H01M 10/0587; H01M 10/05525
See application file for complete search history.

(56) References Cited

U.S. PATENT DOCUMENTS 7,867,644 B2  1/2011  Aota et al.
8,394,526 B2  3/2013  Yoneyama
(Continued)

FOREIGN PATENT DOCUMENTS

CN  101237068 A  8/2008
CN  101978530 A  2/2011
(Continued)

OTHER PUBLICATIONS

Machine translation DE202010005314U1 (Year: 2023).*
(Continued)

*Primary Examiner* — Brian R Ohara
*Assistant Examiner* — Michelle T Leonard
(74) *Attorney, Agent, or Firm* — Lewis Roca Rothgerber Christie LLP

(57) ABSTRACT

A secondary battery comprises: an electrode assembly in which a first electrode plate having a first non-coated part protruding in a first direction, a second electrode plate having a second non-coated part protruding in a second direction opposite to the first direction, and a separator between the first electrode plate and the second electrode plate, are wound; a first current collecting plate electrically coupled to the first non-coated part; a second current collecting plate electrically coupled to the second non-coated part, and having an end part protruding beyond the first current collecting plate by penetrating the winding center of the electrode assembly; and an insulation member between the end part of the second current collecting plate and the first current collecting plate, wherein the end part of the second current collecting plate is coupled with the insulation member.

14 Claims, 13 Drawing Sheets

(51) Int. Cl.
*H01M 10/0587* (2010.01)
*H01M 50/536* (2021.01)

(56) References Cited

U.S. PATENT DOCUMENTS

| | | | |
|---|---|---|---|
| 10,326,122 B2 | 6/2019 | Lee et al. | |
| 2002/0022178 A1* | 2/2002 | Asaka | H01M 10/4257 903/903 |
| 2003/0198863 A1 | 10/2003 | Murashige et al. | |
| 2004/0101746 A1* | 5/2004 | Ota | H01M 50/529 429/332 |
| 2005/0158620 A1 | 7/2005 | Kim et al. | |
| 2008/0182166 A1 | 7/2008 | Aota et al. | |
| 2009/0004559 A1* | 1/2009 | Gardner | H01M 50/566 219/121.64 |
| 2010/0255358 A1 | 10/2010 | Yoneyama | |
| 2011/0076535 A1 | 3/2011 | Aota et al. | |
| 2011/0262783 A1 | 10/2011 | Mehta | |
| 2014/0295256 A1* | 10/2014 | Guen | H01M 50/176 429/179 |
| 2016/0301118 A1 | 10/2016 | Chami et al. | |
| 2017/0117526 A1 | 4/2017 | Lee et al. | |
| 2017/0200567 A1 | 7/2017 | Kim et al. | |

FOREIGN PATENT DOCUMENTS

| | | | | |
|---|---|---|---|---|
| CN | 105470558 A | | 4/2016 | |
| DE | 202010005314 U1 * | | 10/2010 | H01M 10/052 |
| EP | 2521148 A1 | | 11/2012 | |
| JP | 9-35701 A | | 2/1997 | |
| JP | 10-83833 A | | 3/1998 | |
| JP | 2001-93566 A | | 4/2001 | |
| JP | 2002-190314 A | | 7/2002 | |
| JP | 2007-188855 A | | 7/2007 | |
| KR | 10-0658614 B1 | | 12/2006 | |
| KR | 10-2007-0037882 A | | 4/2007 | |
| KR | 10-0709883 B1 | | 4/2007 | |
| KR | 10-2007-0090499 A | | 9/2007 | |
| KR | 10-2008-0066311 A | | 7/2008 | |
| KR | 10-2009-0081966 A | | 7/2009 | |
| KR | 10-1093335 B1 | | 12/2011 | |
| KR | 10-1318569 B1 | | 10/2013 | |
| KR | 10-2017-0047753 A | | 5/2017 | |

OTHER PUBLICATIONS

Machine translation JP2002190314A (Year: 2023).*
Machine translation JP2001093566A (Year: 2024).*
EPO Extended European Search Report dated May 24, 2022, issued in corresponding European Patent Application No. 19864049.2 (8 pages).
International Search Report dated Jan. 6, 2020, for corresponding Application No. PCT/KR2019/012341, 5 pages.
Chinese Office Action dated Oct. 31, 2023, issued in Chinese Patent Application No. 201980073260.2, 22 pages.

* cited by examiner

SECONDARY BATTERY

CROSS-REFERENCE TO RELATED APPLICATION(S)

This application is a U.S. National Phase Patent Application of International Application Number PCT/KR2019/012341, filed on Sep. 23, 2019, which claims priority of Korean Patent Application Number 10-2018-0115239, filed on Sep. 27, 2018, the entire content of each of which is incorporated herein by reference.

TECHNICAL FIELD

The present disclosure relates to a secondary battery capable of preventing a deformation.

BACKGROUND ART

In general, a secondary battery is manufactured by accommodating an electrode assembly including a positive electrode plate, a negative electrode plate, and a separator interposed therebetween in a case with an electrolyte. Unlike a primary battery that is not rechargeable, the secondary battery can be charged and discharged. With technological advances in mobile devices, such as cellular phones and notebook computers, and increased production yields, demand for secondary batteries has rapidly increased. Recently, research and development in secondary batteries has been actively conducted for use as alternative energy sources to replace fossil fuels as energy sources for electric vehicles or hybrid vehicles.

Currently commercially available secondary batteries include a nickel-cadmium battery, a nickel-hydrogen battery, a nickel-zinc battery, a lithium secondary battery, and so on. Specifically, the lithium secondary battery generates little memory effect, compared to a nickel-based secondary battery, making the lithium secondary battery capable of being freely charged and discharged, and has several advantages including a low self-discharge rate and a high-energy density. Accordingly, the lithium secondary battery is drawing increasing attention.

The lithium secondary battery may undergo excessively active reactions between a positive electrode active material and an electrolyte constituting the lithium secondary battery due to overcharging to a certain level of voltage or higher, resulting in a structural collapse of the positive electrode active material, an oxidation of the electrolyte, or precipitation of lithium in a negative electrode active material. If such a state is continued, the lithium secondary battery may ignite or explode.

DESCRIPTION OF EMBODIMENTS

Technical Problem

Provided is a secondary battery capable of preventing a deformation.

Solution to Problem

According to an aspect of the present disclosure, provided is a secondary battery comprising: an electrode assembly in which a first electrode plate having a first non-coated part protruding in a first direction, a second electrode plate having a second non-coated part protruding in a second direction that is opposite to the first direction, and a separator interposed between the first electrode plate and the second electrode plate, are wound so that the first non-coated part and the second non-coated part are exposed in opposite directions; a first current collecting plate electrically coupled to the first non-coated part; a second current collecting plate electrically coupled to the second non-coated part, and having an end part protruding farther toward the outside of the first current collecting plate by penetrating the winding center of the electrode assembly; and an insulation member positioned between the end part of the second current collecting plate and the first current collecting plate, wherein the end part of the second current collecting plate is coupled with the insulation member by pressing the insulation member from the outside thereof.

Here, the end part of the second current collecting plate may be coupled to the outside of the insulation member through riveting.

In addition, the end part of the second current collecting plate may be coupled so as to be more inwardly positioned than the insulation member on the basis of a third direction perpendicular to the first direction.

In addition, the second current collecting plate may include: a current collecting region shaped of plate coupled to the second non-coated part; and a center pin extending from the current collecting region in the first direction and extending, wherein the end part of the center pin plate is coupled with the insulation member by pressing the insulation member.

In addition, the end part of the center pin may be vertically stretched from the center pin.

In addition, the insulation member may be formed by bending so as to correspond to the end part of the center pin.

In addition, the insulation member may include: an insertion portion penetrating the center of the first current collecting plate in the first direction; and an extending part formed by extending from the insertion portion along the outer surface of the first current collecting plate, wherein the end part of the second current collecting plate is coupled such that it extends along the extending part.

In addition, the secondary battery may further include a fastening member coupled to the end part of the center pin.

In addition, the fastening member may include a leaf spring positioned between the insulation member and the first current collecting plate.

In addition, the fastening member may include a nut that is screw-fastened with the end part of the center pin.

In addition, the fastening member may include a body inserted into the center pin in the second direction, and a protrusion protruding from the body.

Advantageous Effects of Disclosure

In the secondary battery according to the present disclosure, a current collecting plate is formed on a non-coated portion protruding upward and downward with respect to a winding center of an electrode assembly, and a center pin is allowed to protrude from a lower current collecting plate, and an upper current collecting plate is fixed while penetrating the electrode assembly, thereby simplifying a manufacturing process and maintaining a stably coupled state.

[DESCRIPTION OF REFERENCE NUMERALS]

Figure 1A:
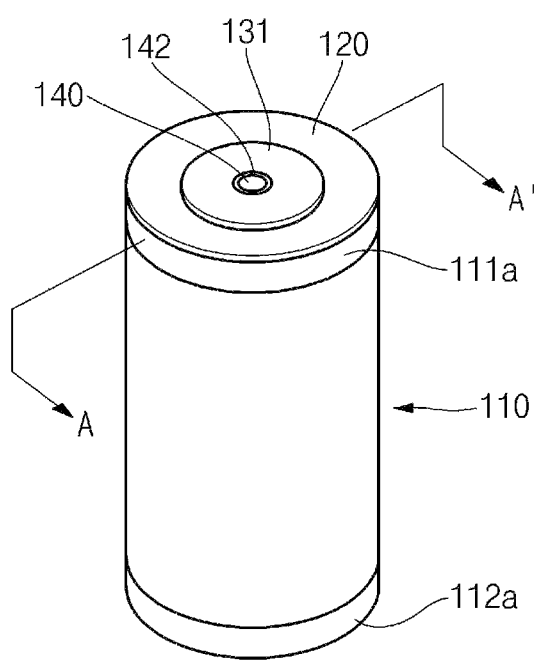
FIG. 1A is a perspective view illustrating a state in which an electrode assembly and a current collecting plate of a secondary battery according to an embodiment of the present disclosure.

110: Electrode assembly
120: First current collecting plate
130: Insulation member
140: Second current collecting plate
141: Current collecting region
142: Center pin
150: Case
160: Connection tab
170: Cap assembly
210: Elastic member
350, 450: Fastening member

MODE OF DISCLOSURE

Hereinafter, various preferred embodiments of the preset disclosure will be described in detail with reference to the accompanying drawings so that those skilled in the art can easily implement the preset disclosure.

Figure 1B:
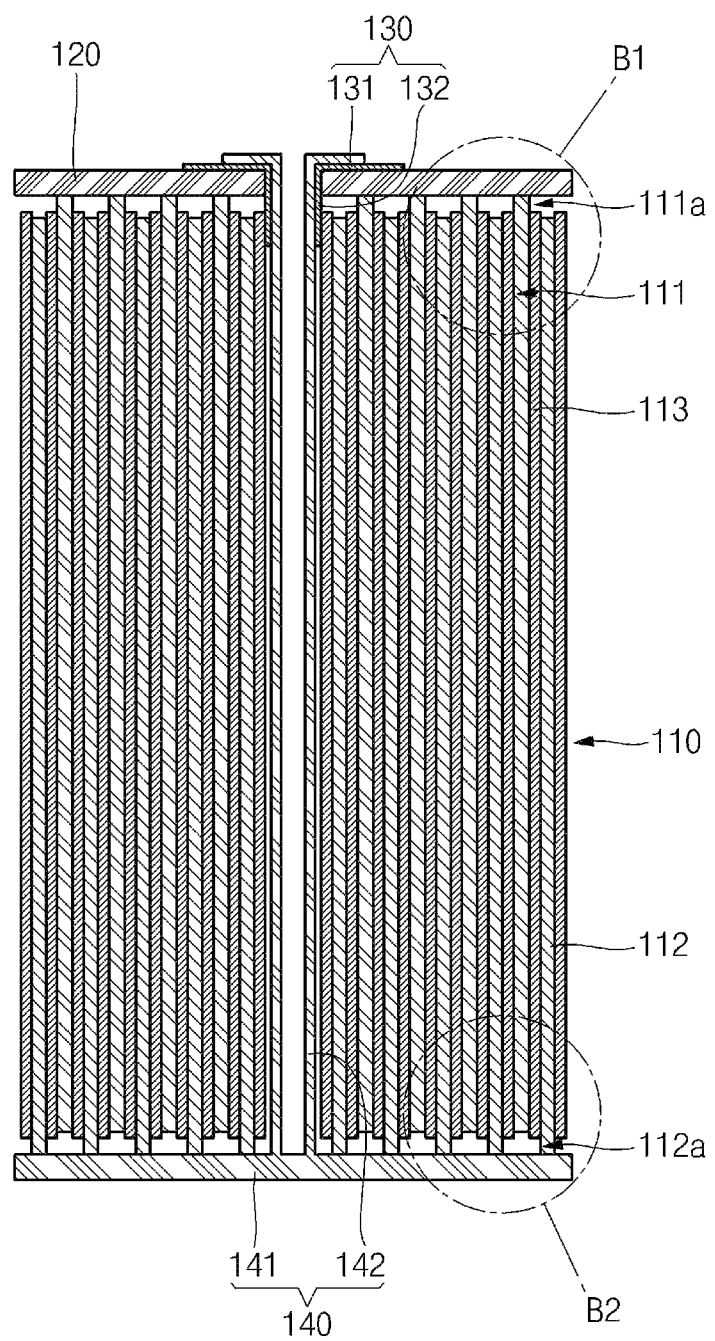
FIG. 1B is a cross-sectional view taken along the line A-A' of FIG. 1A.
Figure 2A:
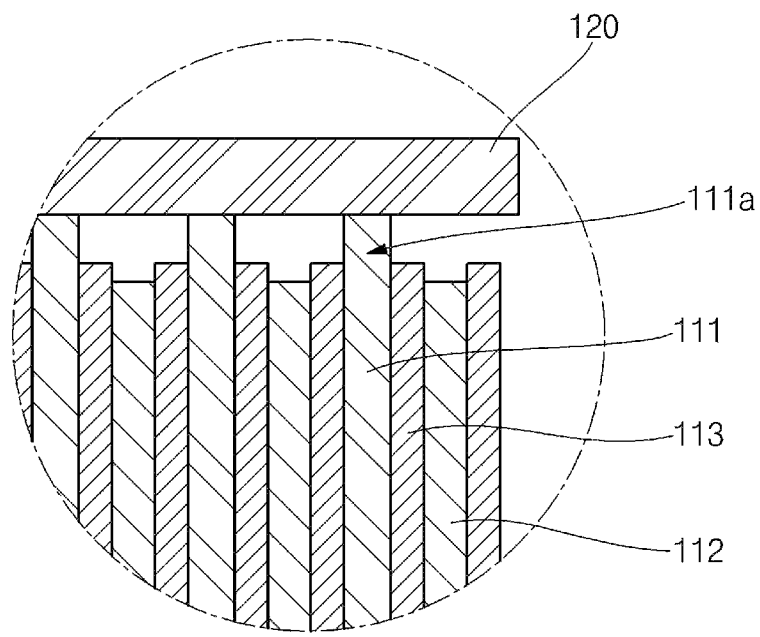
FIGS. 2A and 2B are partially enlarged views of portions B1 and B2 of FIG. 1B.
Figure 2B:
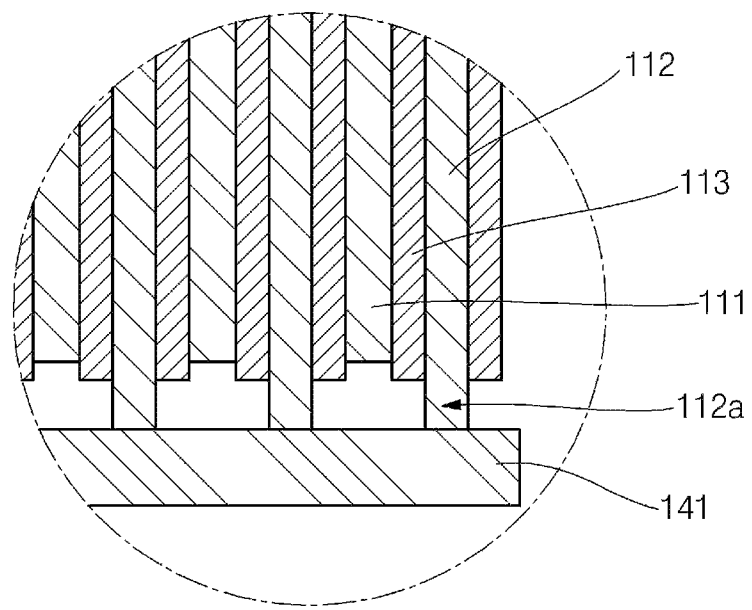
Figure 3A:
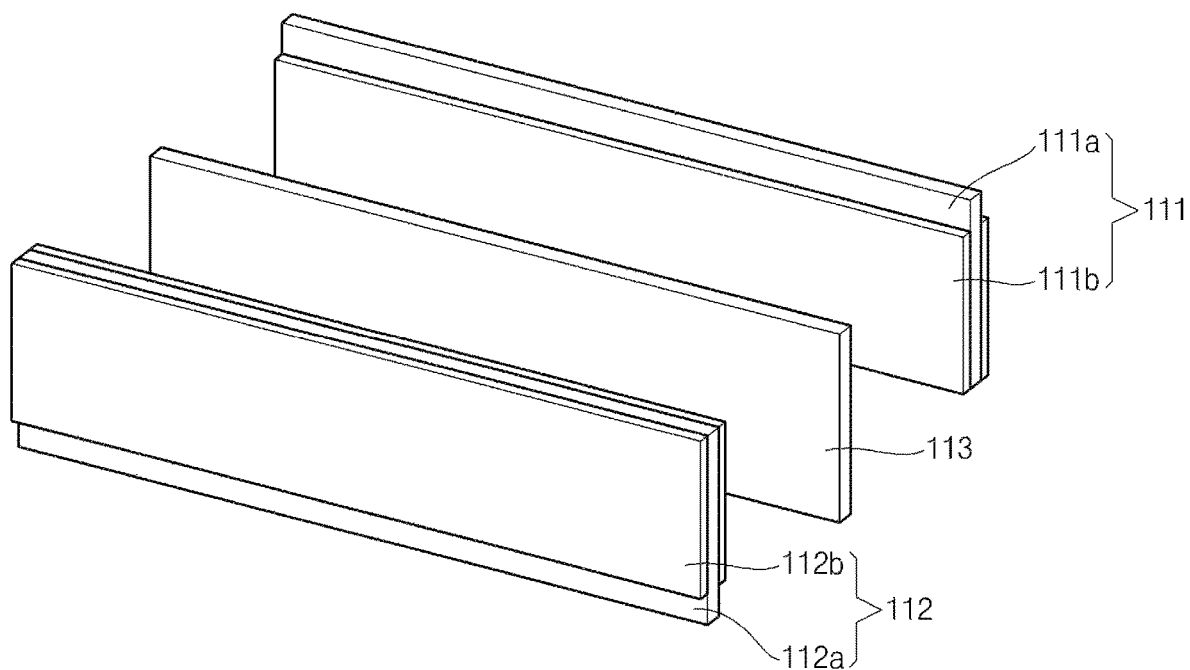
FIG. 3A is a perspective view illustrating the arrangement of electrode plates before winding in a secondary battery according to an embodiment of the present disclosure.
Figure 3B:
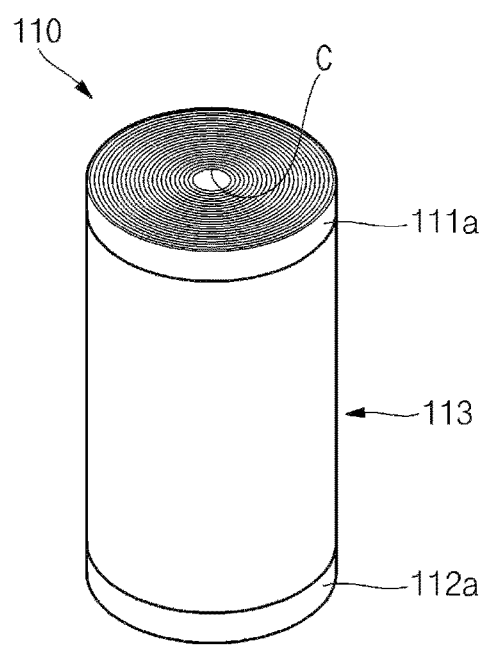
FIG. 3B is a perspective view of an electrode assembly having the electrode plates of FIG. 3A wound.
Figure 3C:
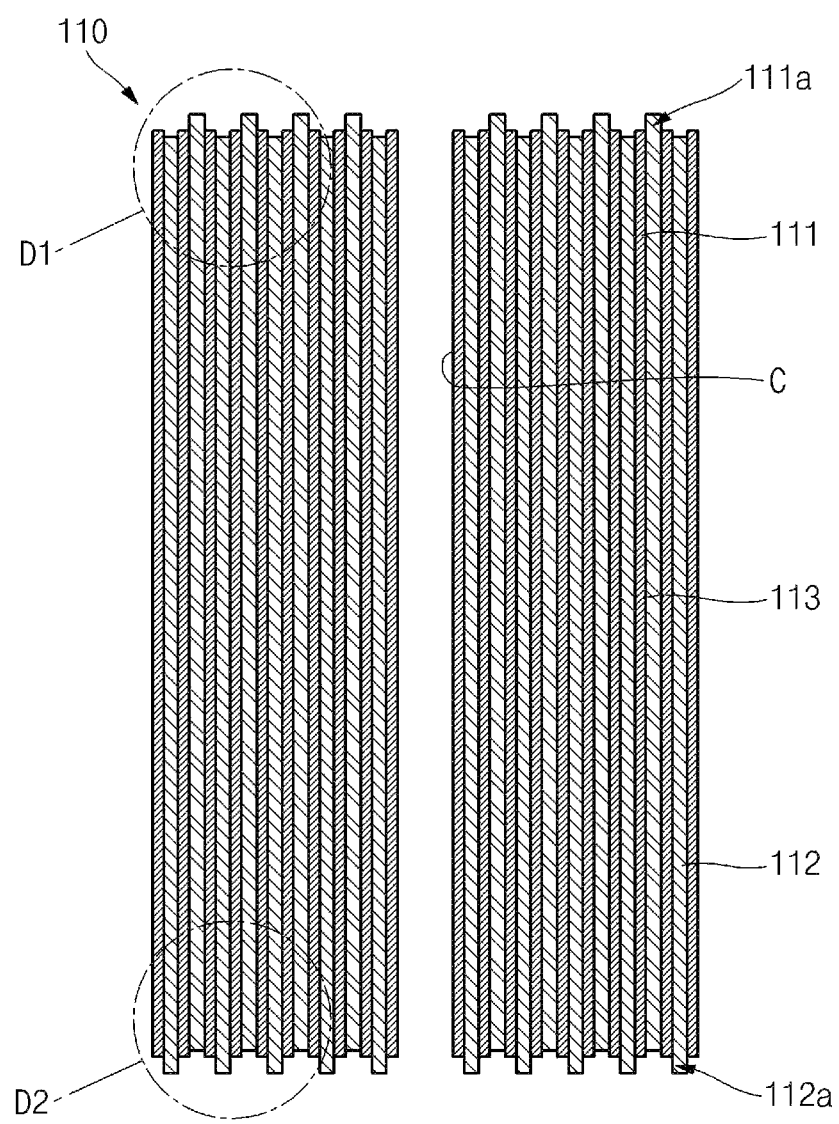
FIG. 3C is a longitudinal cross-sectional view of FIG. 3B.
Figure 3D:
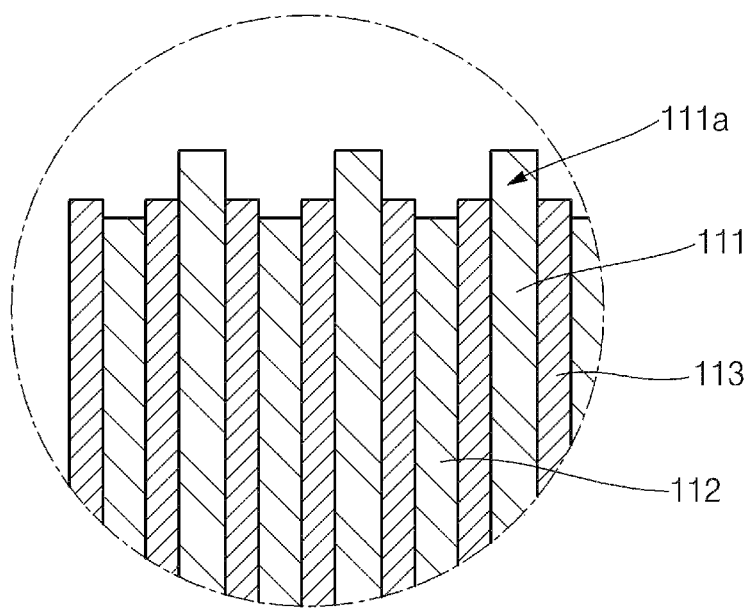
FIGS. 3D and 3E are partially enlarged views of portions D1 and D2 of FIG. 3C.
Figure 3E:
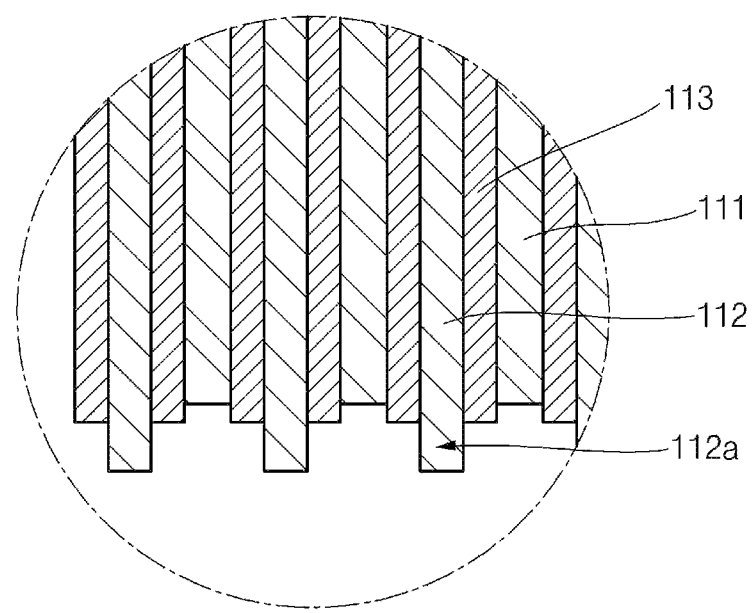

FIG. 1A is a perspective view illustrating a state in which an electrode assembly and a current collecting plate of a secondary battery according to an embodiment of the present disclosure. FIG. 1B is a cross-sectional view taken along the line A-A' of FIG. 1A. FIGS. 2A and 2B are partially enlarged views of portions B1 and B2 of FIG. 1B. FIG. 3A is a perspective view illustrating the arrangement of electrode plates before winding in a secondary battery according to an embodiment of the present disclosure. FIG. 3B is a perspective view of an electrode assembly having the electrode plates of FIG. 3A wound. FIG. 3C is a longitudinal cross-sectional view of FIG. 3B. FIGS. 3D and 3E are partially enlarged views of portions D1 and D2 of FIG. 3C.

Referring to FIGS. 1A to 3E, the secondary battery according to an embodiment of the present disclosure may include an electrode assembly 110, a first current collecting plate 120, an insulation member 130, and a second current collecting plate 140.

The electrode assembly 110 is accommodated in a case to be described later with an electrolyte. The electrolyte may be an organic liquid containing a salt injected to allow lithium ions to move between a positive electrode plate and a negative electrode plate constituting the electrode assembly 110, and may include, but not limited to, a non-aqueous organic electrolytic solution that is a mixture of a lithium salt, such as LiPF6, LiBF4, or LiClO4, and a high-purity organic solvent.

The electrode assembly 110 may include a positive electrode plate 111 coated with a positive electrode active material 111b about a positive electrode substrate 111a, negative electrode plate 112 coated with a negative electrode active material 112b about a negative electrode substrate 112b, and a separator 113 interposed between the positive electrode plate 111 and the negative electrode plate 112 to prevent a short while allowing only lithium ions to move. The positive electrode plate 111, the negative electrode plate 112, and the separator 113 are wound in a substantially cylindrical shape. In addition, the positive electrode plate 111 includes a positive electrode non-coated part 111a having a positive electrode substrate upwardly protruding a predetermined length, and the negative electrode plate 112 includes a negative electrode non-coated part 112a having a negative electrode substrate downwardly protruding a predetermined length, and vice versa.

More specifically, the positive electrode substrate of the positive electrode plate 111 may include a plate-shaped positive electrode substrate made of aluminum (Al) and may have the non-coated part 111a exposed in a first direction, for example, upward. In addition, the positive electrode plate 111 may include a coated part 111b formed by coating an active material made of a transition metal oxide on both surface of the positive electrode substrate. That is, the coated part 111b collectively refers to a region of the positive electrode substrate, which is coated with the active material, and the non-coated part 111a corresponds to a region in which the positive electrode plate 111, except for the coated part 111b, is exposed in the first direction. Meanwhile, the positive electrode plate 111 may be electrically coupled to the first current collecting plate 120 through the non-coated part 111a. The non-coated part 111a and the first current collecting plate 120 may be coupled to each other through welding, and a variety of welding processes, including laser welding, ultrasonic welding, etc., may be applied.

The negative electrode plate 112 may include a plate-shaped negative electrode substrate made of copper (Cu) or nickel (Ni) and may have the non-coated part 112a exposed in a second direction opposite to the first direction, for example, downward. In addition, the negative electrode plate 112 may include a coated part 112b formed by coating an active material made of a transition metal oxide on both surface of the negative electrode substrate. That is, the coated part 112b collectively refers to a region of the negative electrode substrate, which is coated with the active material, and the non-coated part 112a corresponds to a region in which the negative electrode plate 112, except for the coated part 112b, is exposed in the second direction. Meanwhile, the negative electrode plate 112 may be electrically coupled to a bottom portion 141 of the center pin 140, which will be described later, through the non-coated part 112a. The non-coated part 112a and the bottom portion 141 of the center pin 140 may be coupled to each other through welding, and a variety of welding processes, including laser welding, ultrasonic welding, etc., may be applied.

The first current collecting plate 120 is coupled to the electrode assembly 110 in the first direction, for example, from an upper portion. The first current collecting plate 120 may be formed of the same material as the positive electrode substrate of the electrode assembly 110. Specifically, the first current collecting plate 120 may be made of aluminum or an aluminum alloy. The first current collecting plate 120 may be electrically coupled to the non-coated part 111a from the positive electrode plate 111 of the electrode assembly 110. Coupling of the first current collecting plate 120 and the non-coated part 111a may be achieved by welding, as described above. In addition, the non-coated part 111a coupled to the first current collecting plate 120 is directly coupled to the first current collecting plate 120 without a separate electrode tab, thereby improving current collecting efficiency.

The first current collecting plate 120 has a through-hole formed substantially at the center. The through-hole may be penetrated by the insulation member 130 in the first direction, and thus the position of the first current collecting plate 120 may be fixed. In addition, the first current collecting plate 120 may be pressed by the insulation member 130, and thus may be maintained at a stably coupled state with respect to the non-coated part 111a.

The insulation member 130 is coupled to the through-hole of the insulation plate 120 in the first direction, for example, from the upper portion. More specifically, in a state in which the electrode assembly 110 is wound, the insulation member 130 may penetrate the through-hole to be coupled to the interior side of the electrode assembly 110, specifically to a center pin 142 of the second current collecting plate 140 positioned inside the electrode assembly 110. The insulation member 130 is positioned between the center pin 142 and the interior side of the electrode assembly 110, and thus the interior side of the electrode assembly 110 may be electrically independent of the first current collecting plate 120. Therefore, an electrode plate formed inside the electrode assembly 110 may be prevented from contacting the first current collecting plate 120, thereby stably preventing an electrical short. The insulation member 130 may be made of PP or PET, which is a general insulating material, but embodiments of the present disclosure are not limited thereto.

The insulation member 130 may include an insertion portion 132 coupled to the center of the electrode assembly 110, and an extending part 131 bent from the insertion portion 132 about 90 degrees to then extend along the top surface of the first current collecting plate 120. The insertion portion 132 and the extending part 131 may be integrally formed with each other, and the extending part 131 may further extend in a transverse direction relative to the center pin 142 of the second current collecting plate 140, which will be described later, thereby preventing the center pin 142 from contacting the first current collecting plate 120.

The second current collecting plate 140 is coupled to the electrode assembly 110 in the second direction, for example, from a lower portion of the electrode assembly 110. The second current collecting plate 140 may be electrically coupled to the non-coated part 112a downwardly protruding from the negative electrode plate 112 of the electrode assembly 110. The coupling of the second current collecting plate 140 may also be achieved by welding. The second current collecting plate 140 may be later coupled to the bottom surface of a case when being inserted into the case with the electrode assembly 110, and thus the current collecting region 141 of the second current collecting plate 140 may be coupled to the case. The second current collecting plate 140 and the case may have the same polarity as the negative electrode plate 112 of the electrode assembly 110 through the current collecting region 141. The second current collecting plate 140 may be made of copper or a copper alloy, like the negative electrode plate 112 of the electrode assembly 110, but embodiments of the present disclosure are not limited thereto.

Meanwhile, the second current collecting plate 140 may include the center pin 142 formed substantially at the center so as to protrude from the current collecting region 141 in the first direction, for example, upward. The center pin 142 may be formed to have the same diameter as a mandrel used in winding the electrode assembly 110, and thus the electrode assembly 110 may be penetrated by the center pin 142 to then be coupled thereto. In addition, after penetrating the electrode assembly 110, the center pin 142 may upwardly protrude farther than the first current collecting plate 120. In addition, as described above, the insulation member 130 may be coupled to the through-hole of the first current collecting plate 120, such that the center pin 142 penetrates the interior side of the insulation member 130. Therefore, the center pin 142 may be electrically disconnected from the first current collecting plate 120 by means of the insulation member 130.

In addition, an end part of the center pin 142 is bent along the top surface of the first current collecting plate 120 to then extend. The bending and extending may be achieved by riveting the end part of the center pin 142. However, the extending part 131 of the insulation member 130 is positioned between the center pin 142 and the first current collecting plate 120 and the extending part 131 further extends in a transverse direction relative to the end part of the center pin 142, and thus the center pin 142 may also be separated from the top surface of the first current collecting plate 120. In addition, the shape of the center pin 142 may allow the second current collecting plate 140 to be maintained at a stably coupled state with respect to the electrode assembly 110, the first current collecting plate 120, and the insulation member 130.

Hereinafter, a process of coupling an electrode assembly and a current collecting plate in a secondary battery according to an embodiment of the present disclosure will be described in greater detail.

Figure 4A:
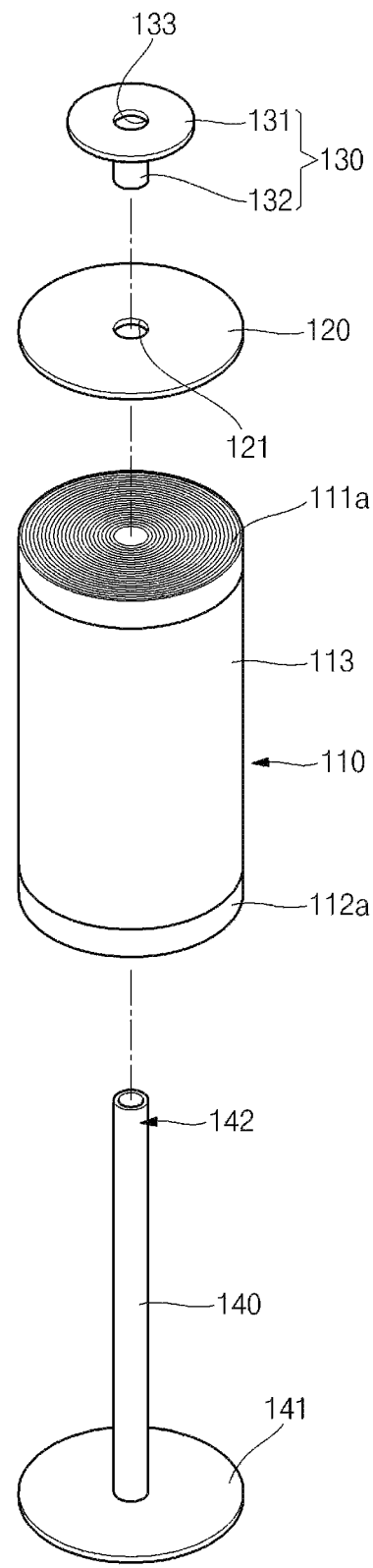
FIG. 4A is an exploded perspective view of an electrode assembly of a secondary battery according to an embodiment of the present disclosure.
Figure 4B:
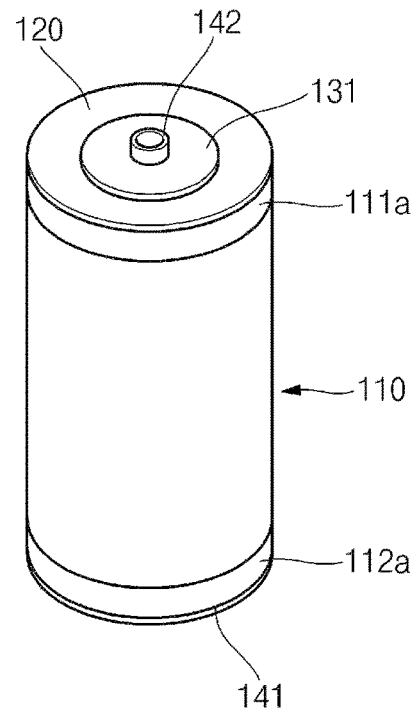
FIGS. 4B and 4C are perspective views illustrating a step of coupling a current collecting plate to the electrode assembly of FIG. 4A.
Figure 4C:
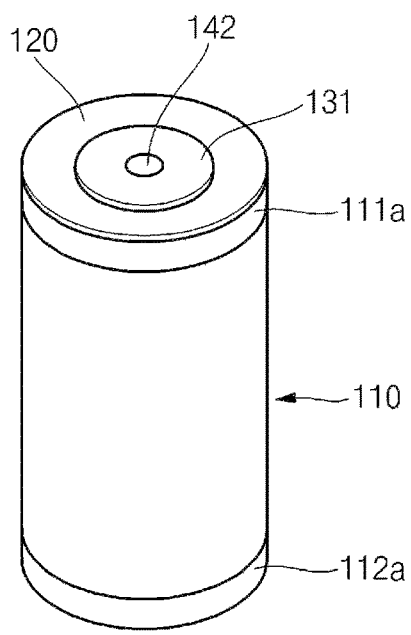

FIG. 4A is an exploded perspective view of an electrode assembly of a secondary battery according to an embodiment of the present disclosure. FIGS. 4B and 4C are perspective views illustrating a step of coupling a current collecting plate to the electrode assembly of FIG. 4A.

Referring to FIG. 4A, in the secondary battery according to an embodiment of the present disclosure, the center pin 142 of the second current collecting plate 140 is coupled to the electrode assembly 110 from a lower portion thereof so as to penetrate the center thereof, such that the current collecting region 141 of the second current collecting plate 140 is coupled to the non-coated part 112a of the negative electrode plate 112 of the electrode assembly 110. The current collecting region 141 may be fixed to the non-coated part 112a through welding.

In addition, the first current collecting plate 120 may be coupled to the non-coated part 111a of the positive electrode plate 111 upwardly protruding from the electrode assembly 110, and the non-coated part 111a and the first current collecting plate 120 may be fixed through welding.

In addition, the insulation member 130 may be coupled to the through-hole 121 of the first current collecting plate 120 from the upper portion thereof, and an insertion portion 132 of the insulation member 130 may protrude downwardly to then penetrate the through-hole 121. Accordingly, the insertion portion 132 may be inserted into the interior side of the electrode assembly 110.

In addition, the insulation member 130 may also include a through-hole 133 at a location corresponding to the through-hole 121 of the first current collecting plate 120, and the center pin 142 of the second current collecting plate 140 may penetrate the through-hole 133 of the insulation member 130, so that the end part of the center pin 142 may be exposed to the upper portion of the insulation member 130, as shown in FIG. 4B.

Referring to FIG. 4C, the exposed end part of the center pin 142 may be formed through riveting. The end part of the center pin 142 may extend along the insulation member 130 in the transverse direction. However, as described above, since the end part of the center pin 142 less extends in the transverse direction relative to the insulation member 130, the end part of the center pin 142 may be electrically disconnected from the first current collecting plate 120.

Hereinafter, the remaining portions of the secondary battery according to an embodiment of the present disclosure will be described in greater detail.

Figure 5:
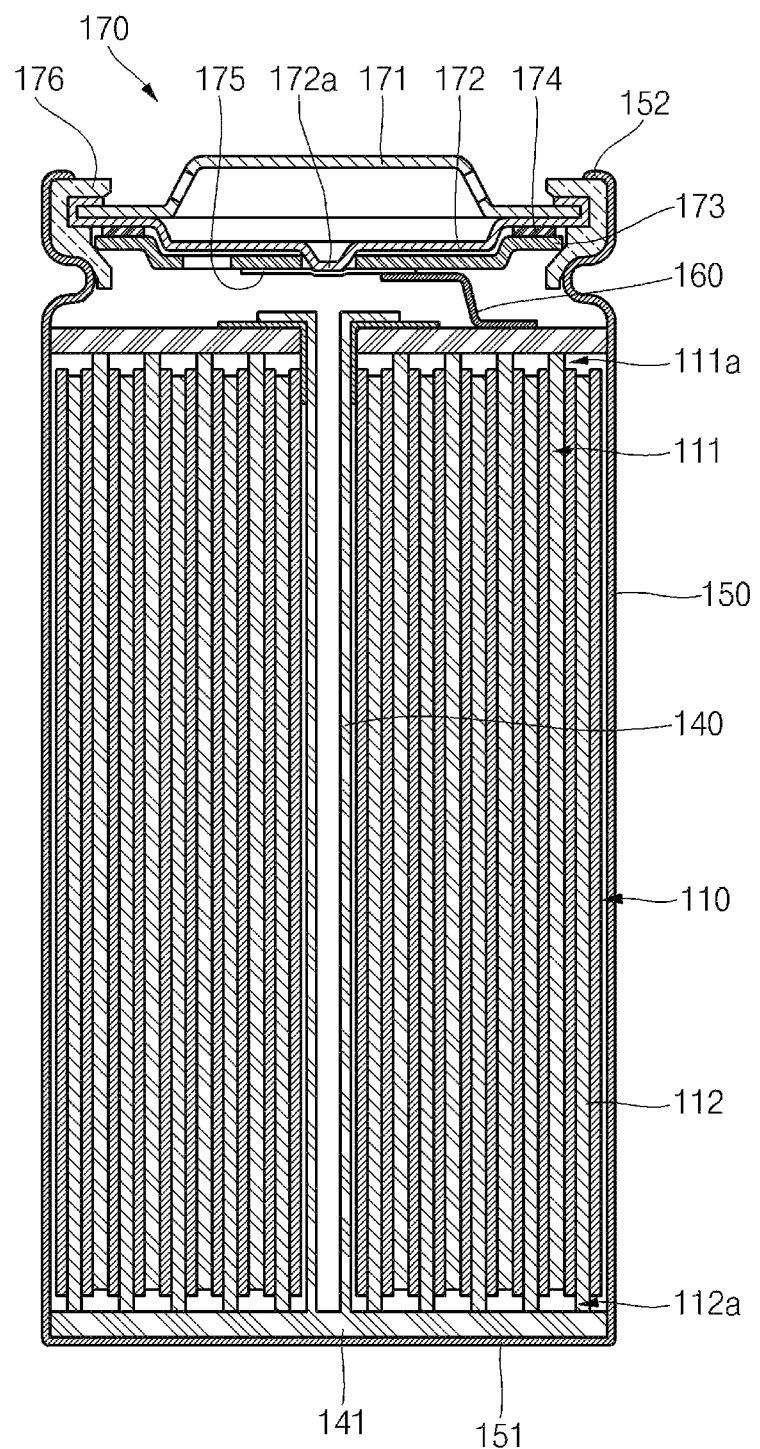
FIG. 5 is a cross-sectional view of a secondary battery according to an embodiment of the present disclosure.

FIG. 5 is a cross-sectional view of a secondary battery according to an embodiment of the present disclosure As shown in FIG. 5, after the electrode assembly 110 is coupled to the first current collecting plate 120, the insulation member 130 and the second current collecting plate 140, the electrode assembly 110 may be inserted into and mounted in the case 150.

The secondary battery 100 according to the present disclosure may include a cap assembly 170 for sealing a top opening of the case 150, in addition to the case 150.

The case 150 includes a circular bottom portion 151 and a side portion extending upwardly a predetermined length from the bottom portion 151. Although the secondary battery 100 illustrated herein is a cylindrical secondary battery, the present disclosure may also be applied to a prismatic or pouch-type secondary battery, and does not limit the shape of the secondary battery to the illustrated cylindrical secondary battery. During manufacture of the secondary battery 100, a top portion of the case 150 is in an opened state. Therefore, during assembling of the secondary battery, the electrode assembly 110 may be inserted into the case 150 with an electrolyte. The case 150 may be made of steel, a steel alloy, aluminum, an aluminum alloy, or an equivalent thereof, but embodiments of the present disclosure are not limited thereto.

A current collecting region 141 of the second current collecting plate 140 may be coupled to the bottom portion 151, and welding may be used for coupling thereof or a conductive adhesive may also be used. Accordingly, the bottom portion 151 may have the same polarity as the second current collecting plate 140.

In addition, an inwardly recessed beading part may be formed at a lower portion of the case 150 about the cap assembly 170 so as to prevent the electrode assembly 110 from deviating to the outside, and an inwardly recessed crimping part 152 may be formed at an upper portion thereof.

The cap assembly 170 may include a cap-up 171 having a plurality of through-holes 131d, a cap-down 172 installed at a lower portion of the cap-up 171, an insulation plate 173 formed at a lower portion of the cap-down 172, a connection ring 174 formed between the cap-down 172 and the insulation plate 173, a sub-plate 175 formed at a lower portion of the insulation plate 173, and an insulation gasket 176 for maintaining a sealed state by crimping the cap assembly 170 with the case 150. In addition, a safety vent 172a downwardly protrudes at the center of the cap-down 172 and penetrates the insulation plate 173 to then be coupled to the sub-plate 175, and the sub-plate 175 is electrically connected to the first current collecting plate 120 through the connection tab 160, and thus the cap-up 171 of the cap assembly 170 may have the same polarity as the positive electrode plate 111 of the electrode assembly 110.

In addition, when the internal pressure of the case 150 exceeds a reference level, the safety vent 172a may be inverted to cut an electrical connection between the safety vent 172a and the connection tab 160, thereby preventing an accident, such as explosion of battery Hereinafter, a configuration of a secondary battery according to another embodiment of the present disclosure will be described.

Figure 6:
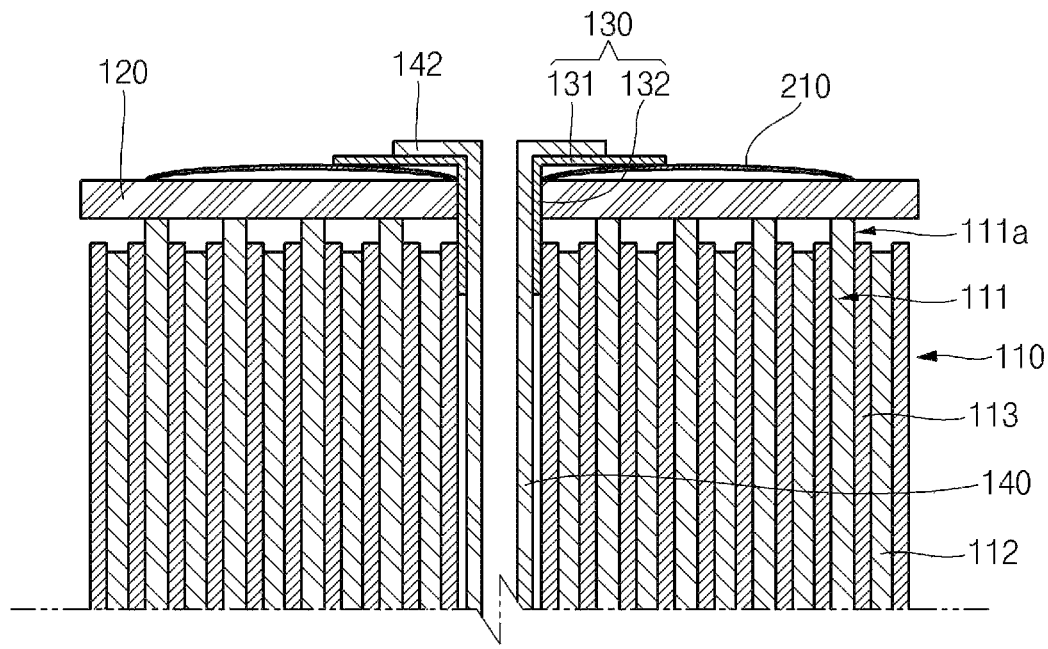
FIG. 6 is a partially cross-sectional view illustrating a state in which an electrode assembly and a current collecting plate of a secondary battery according to another embodiment of the present disclosure.

FIG. 6 is a partially cross-sectional view illustrating a state in which an electrode assembly and a current collecting plate of a secondary battery according to another embodiment of the present disclosure.

Referring to FIG. 6, the secondary battery according to another embodiment of the present disclosure may further include an elastic member 210 between the top surface of the first current collecting plate 120 and the extending part 131 of the insulation member 130.

The elastic member 210 may maintain constant coupling forces of the insulation member 130 and the second current collecting plate 140 with respect to the first current collecting plate 120 using an elastic restoring force. To this end, the elastic member 210 may include a leaf spring. The elastic member 210 is maintained at a pressed state by the extending part 131 of the insulation member 130, and thus a constant elastic restoring force may be applied thereto.

Hereinafter, a configuration of a secondary battery according to still another embodiment of the present disclosure will be described.

Figure 7A:
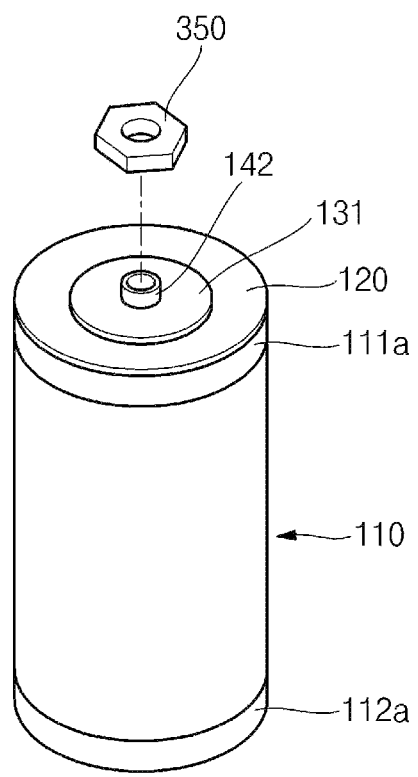
FIGS. 7A and 7B are partially cross-sectional views illustrating a state in which an electrode assembly and a current collecting plate of a secondary battery according to still another embodiment of the present disclosure.
Figure 7B:
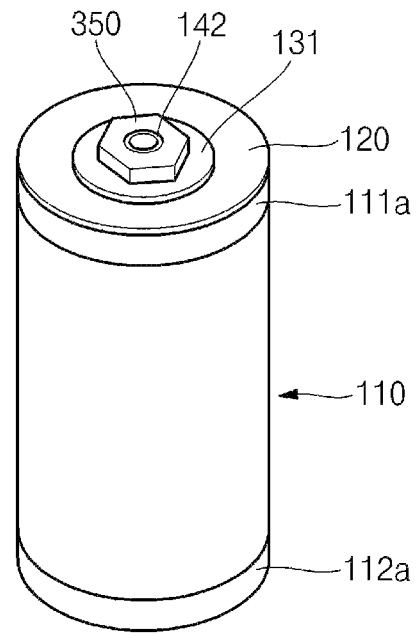
Figure 7C:
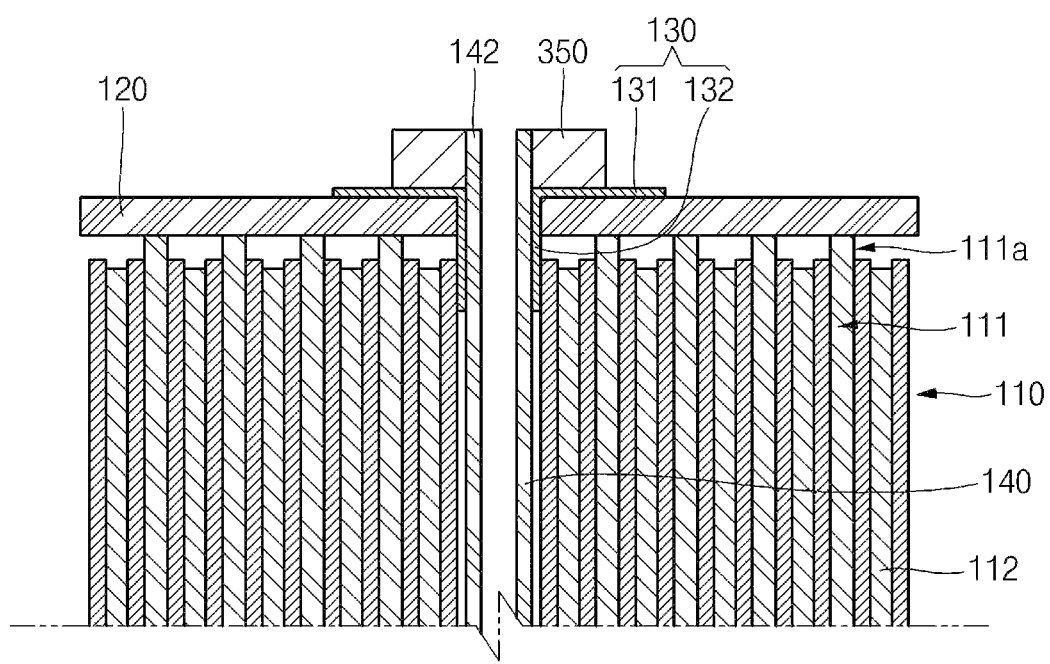
FIG. 7C is a longitudinal cross-sectional view of FIG. 7B.

FIGS. 7A and 7B are partially cross-sectional views illustrating a state in which an electrode assembly and a current collecting plate of a secondary battery according to still another embodiment of the present disclosure. FIG. 7C is a longitudinal cross-sectional view of FIG. 7B.

Referring to FIGS. 7A and 7B, in the secondary battery according to still another embodiment of the present disclosure, an end part of a center pin 142 protruding further than an insulation member 130 may be coupled by pressing the insulation member 130 through a fastening member 350. The fastening member 350 may be in the form of a nut, and, to this end, a screw corresponding thereto may be further formed at the exposed end part of the center pin 142. Therefore, the end part of the center pin 142 and the fastening member 350 may be screw-fastened, thereby maintaining a stably coupled state. In such a case, the fastening member 350 has a smaller diameter than that of the extending part 131 of the insulation member 130, and thus the fastening member 350 and the first current collecting plate 120 may be electrically separated from each other.

Hereinafter, a configuration of a secondary battery according to still another embodiment of the present disclosure will be described.

Figure 8A:
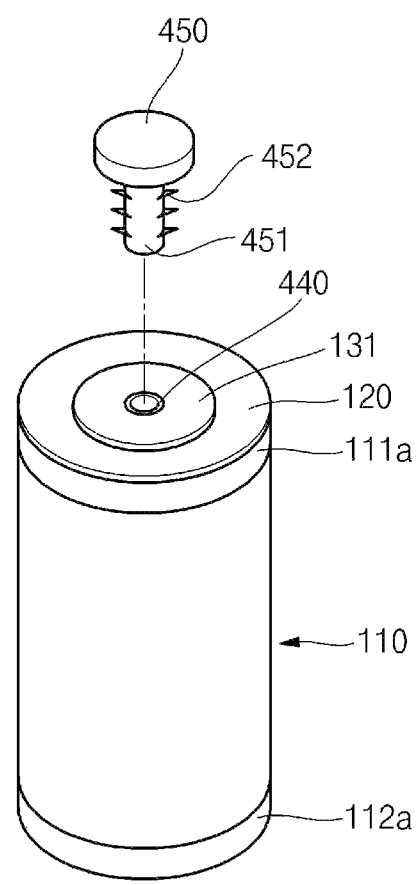
FIGS. 8A and 8B are partially cross-sectional views illustrating a state in which an electrode assembly and a current collecting plate of a secondary battery according to still another embodiment of the present disclosure.
Figure 8B:
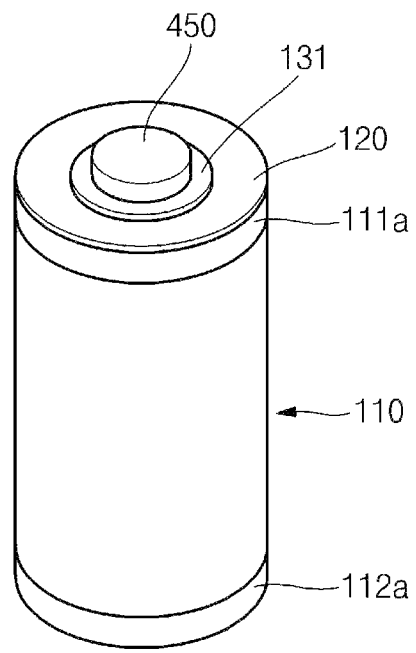
Figure 8C:
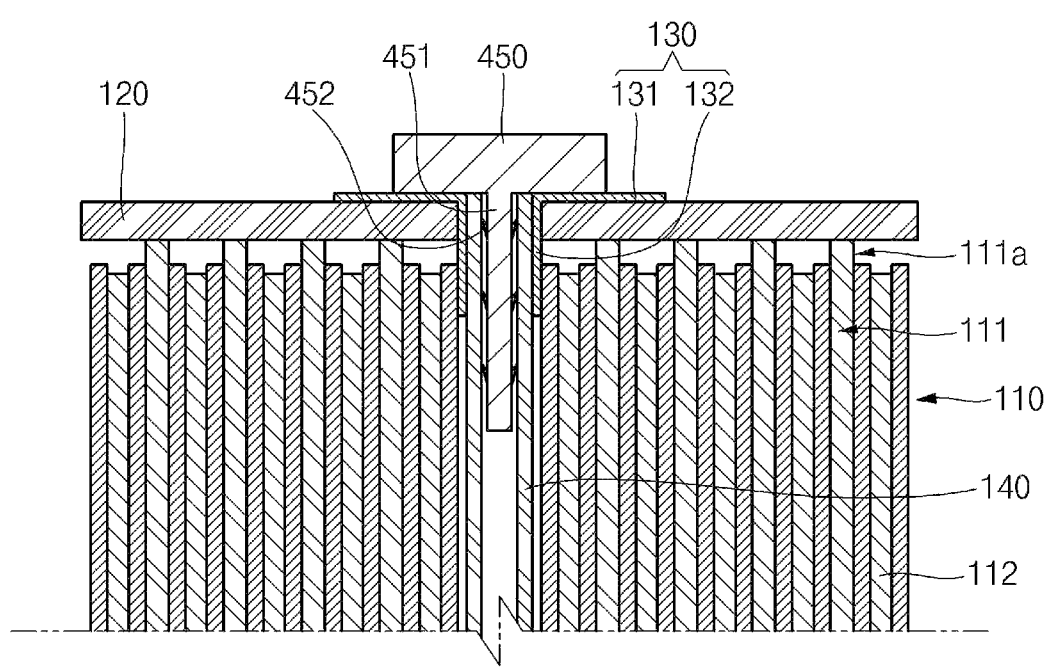
FIG. 8C is a longitudinal cross-sectional view of FIG. 8B.

FIGS. 8A and 8B are partially cross-sectional views illustrating a state in which an electrode assembly and a current collecting plate of a secondary battery according to still another embodiment of the present disclosure. FIG. 8C is a longitudinal cross-sectional view of FIG. 8B.

Referring to FIGS. 8A and 8B, in the secondary battery according to still another embodiment of the present disclosure, the center pin 142 may be coupled to the same height as the insulation member 130, so that the end part of the center pin 142 may not upwardly protrude. In addition, with respect to the center pin 142, a fastening member 450 may be coupled to the center pin 142 from an upper portion thereof so as to be fixed to the interior side of the center pin 142, thereby maintaining coupling structures of the center pin 142, the electrode assembly 110, and the current collecting plate 120. The fastening member 450 may be forcibly inserted into the interior side of the center pin 142. To this end, the fastening member 450 may include a body 451 inserted toward the center pin 142, and a protrusion 452 laterally protruding from the body 451. After the body 451 is inserted into the center pin 142, the protrusion 452 may prevent the fastening member 450 from being dislodged from the center pin 142 through a frictional force.

While an electrode assembly and a secondary battery including the same according to the present invention have been particularly shown and described with reference to some exemplary embodiments thereof, it will be understood by those of ordinary skill in the art that various changes in form and details may be made therein without departing from the spirit and scope of the present invention as set forth in the following claims.

INDUSTRIAL APPLICABILITY

The present disclosure relates to a secondary battery capable of preventing a deformation.

The invention claimed is:

1. A secondary battery comprising:
an electrode assembly in which a first electrode plate having a first non-coated part protruding in a first direction, a second electrode plate having a second non-coated part protruding in a second direction that is opposite to the first direction, and a separator interposed between the first electrode plate and the second electrode plate, are wound so that the first non-coated part and the second non-coated part are exposed in opposite directions;
a first current collecting plate electrically coupled to the first non-coated part;
a second current collecting plate electrically coupled to the second non-coated part; and
an insulation member positioned between the first current collecting plate and the second current collecting plate,
wherein the second current collecting plate comprises a current collecting area having a plate shape and connected to the second non-coated part, and a center pin connected to the current collecting area,
wherein the center pin comprises a first area extending in the first direction and a second area extending in a third direction perpendicular to the first direction, the second area overlapping with the electrode assembly in a plan view,
wherein the insulation member comprises an insertion portion extending in the first direction and an extension portion extending in the third direction,
wherein the extension portion is between the second area and the first current collecting plate and contacts the first current collecting plate.

2. The secondary battery of claim 1, wherein the second area is coupled to an outside of the insulation member through riveting.

3. The secondary battery of claim 1, wherein a length of the extension portion is longer than a length of the second area.

4. The secondary battery of claim 1, further comprising a fastening member coupled to the second area.

5. The secondary battery of claim 4, wherein the fastening member includes a nut that is screw-fastened with the second area.

6. The secondary battery of claim 4, wherein the fastening member includes a body inserted into the center pin in the second direction, and a protrusion protruding from the body.

7. The secondary battery of claim 1, wherein the extension portion comprises an area where the second area is not disposed.

8. The secondary battery of claim 1, wherein the insertion portion contacts the separator.

9. The secondary battery of claim 1, wherein the insertion portion comprises an area located between the first area and the separator.

10. The secondary battery of claim 1, further comprising an elastic member between the insertion portion and the first current collecting plate.

11. The secondary battery of claim 10, wherein the elastic member comprises a leaf spring.

12. The secondary battery of claim 1, further comprising a case accommodating the electrode assembly, the first current collecting plate, and the second current collecting plate.

13. The secondary battery of claim 12, wherein the case comprises a bottom portion and a side portion, and
wherein the second current collecting plate is coupled to the bottom portion.

14. A secondary battery comprising:
an electrode assembly in which a first electrode plate having a first non-coated part protruding in a first direction, a second electrode plate having a second non-coated part protruding in a second direction that is opposite to the first direction, and a separator interposed between the first electrode plate and the second electrode plate, are wound so that the first non-coated part and the second non-coated part are exposed in opposite directions;
a first current collecting plate electrically coupled to the first non-coated part;
a second current collecting plate electrically coupled to the second non-coated part; and
an insulation member between the first current collecting plate and the second current collecting plate, wherein the second current collecting plate comprises a current collecting area having a plate shape and connected to the second non-coated part; and
a center pin connected to the current collecting area,
wherein the center pin comprises a center pin in the first direction and a center pin in a third direction and overlapping with the electrode assembly in a plan view,
wherein the third direction is perpendicular to the first direction,
wherein the insulating member comprises an insertion portion extending in the first direction and an extension portion extending in the third direction, and
wherein the extension portion is between the center pin in the third direction and the first current collecting plate and contacts the first current collecting plate.

* * * * *